US008573853B2

(12) United States Patent
Ordo et al.

(10) Patent No.: US 8,573,853 B2
(45) Date of Patent: Nov. 5, 2013

(54) PLUG ASSEMBLY

(75) Inventors: Attila Joseph Ordo, Mechanicsburg, PA (US); Lawrence Se-Jun Oh, Hummelstown, PA (US); Richard Vincent Lucente, Mechanicsburg, PA (US); Brent David Yohn, Newport, PA (US)

(73) Assignee: Tyco Electronics Corporation, Berwyn, PA (US)

(*) Notice: Subject to any disclaimer, the term of this patent is extended or adjusted under 35 U.S.C. 154(b) by 269 days.

(21) Appl. No.: 12/861,530

(22) Filed: Aug. 23, 2010

(65) Prior Publication Data

US 2012/0045175 A1 Feb. 23, 2012

(51) Int. Cl.
*G02B 6/36* (2006.01)

(52) U.S. Cl.
USPC ................................ 385/53; 385/55; 439/320

(58) Field of Classification Search
USPC ...................................... 385/53-55; 439/320
See application file for complete search history.

(56) References Cited

U.S. PATENT DOCUMENTS

| | | | | |
|---|---|---|---|---|
| 2,669,702 | A | 2/1954 | Klostermann | |
| 3,478,302 | A | 11/1969 | Chirumbolo | |
| 3,729,699 | A | 4/1973 | Briggs et al. | |
| 5,564,951 | A | 10/1996 | Attal et al. | |
| 6,007,385 | A | 12/1999 | Wu | |
| 6,409,532 | B2 | 6/2002 | Payson et al. | |
| 6,435,911 | B1 | 8/2002 | Payson et al. | |
| 6,475,009 | B2 | 11/2002 | Below et al. | |
| 6,582,248 | B2 * | 6/2003 | Bachman | 439/462 |
| 6,595,791 | B2 | 7/2003 | Below et al. | |
| 6,817,902 | B2 | 11/2004 | Bernardi et al. | |
| 6,853,316 | B2 | 2/2005 | Payson et al. | |
| 7,018,226 | B2 | 3/2006 | Milner et al. | |
| 7,063,550 | B1 | 6/2006 | Chen et al. | |
| 7,074,066 | B2 | 7/2006 | Pepe | |
| 7,097,486 | B2 | 8/2006 | Parsons | |
| 7,165,987 | B2 | 1/2007 | Kim et al. | |
| 7,175,459 | B2 | 2/2007 | Milner et al. | |
| 7,213,975 | B2 | 5/2007 | Khemakhem et al. | |
| 7,234,877 | B2 | 6/2007 | Sedor | |
| D555,597 | S | 11/2007 | Phung et al. | |
| 7,303,418 | B2 | 12/2007 | O'Connor | |
| 7,316,583 | B1 | 1/2008 | Mistarz | |
| 7,326,073 | B2 | 2/2008 | Hanning et al. | |
| 7,338,214 | B1 | 3/2008 | Guerreri et al. | |

(Continued)

FOREIGN PATENT DOCUMENTS

| | | |
|---|---|---|
| DE | 102 36 275 B3 | 1/2004 |
| DE | 20 2005 002162 U1 | 4/2005 |

(Continued)

OTHER PUBLICATIONS

International Search Report, International Application No. PCT/US2011/001472, International Filing Date, Aug. 23, 2011.

*Primary Examiner* — Ellen Kim

(57) ABSTRACT

A plug assembly includes a circular plug shell having a cavity configured to receive a modular plug connector therein. The circular plug shell is configured to be threadably coupled to a corresponding circular jack shell. An insert is loaded into the cavity or the circular plug shell. The insert includes an adapter having a one or two piece body having a circular geometry. The body has a connector chamber configured to hold the modular plug connector therein.

20 Claims, 12 Drawing Sheets

(56) References Cited

U.S. PATENT DOCUMENTS

| | | | | |
|---|---|---|---|---|
| 7,367,832 | B2 | 5/2008 | Muhs et al. | |
| D582,851 | S | 12/2008 | Lavy | |
| 7,481,585 | B2 | 1/2009 | Scadden et al. | |
| 7,490,994 | B2 | 2/2009 | Scadden et al. | |
| 7,632,126 | B1 | 12/2009 | Farole et al. | |
| 8,035,975 | B2 * | 10/2011 | Wu | 361/747 |
| 8,128,294 | B2 * | 3/2012 | Lu et al. | 385/53 |
| 2002/0155756 | A1 | 10/2002 | Yoshioka | |
| 2004/0062487 | A1 * | 4/2004 | Mickievicz | 385/56 |
| 2005/0024316 | A1 | 2/2005 | Izzo | |
| 2005/0041928 | A1 * | 2/2005 | Zimmel et al. | 385/55 |
| 2005/0058402 | A1 * | 3/2005 | Ernst et al. | 385/56 |
| 2005/0064752 | A1 | 3/2005 | Serino | |
| 2006/0068625 | A1 | 3/2006 | Kim et al. | |
| 2009/0148101 | A1 | 6/2009 | Lu et al. | |
| 2009/0202207 | A1 | 8/2009 | Grzegorzewska et al. | |
| 2009/0233475 | A1 | 9/2009 | Mildon et al. | |
| 2010/0266242 | A1 * | 10/2010 | Lu et al. | 385/53 |

FOREIGN PATENT DOCUMENTS

| | | | |
|---|---|---|---|
| DE | 10 2008 051468 | A1 | 4/2010 |
| WO | WO 95/23442 | A2 | 8/1995 |
| WO | WO 2008/098268 | A2 | 8/2008 |
| WO | WO 2010/030631 | A1 | 3/2010 |

* cited by examiner

PLUG ASSEMBLY

BACKGROUND OF THE INVENTION

The subject matter herein relates generally to plug assemblies, and more particularly, to plug assemblies for use in harsh environments.

Telecommunication and other types of data networks are used for transmitting high bandwidth voice and data signals. There are a number of different standardized connectors in use for interconnecting runs of cables together in such systems, including copper-based connectors and fiber optic cable connectors. The connectors are typically standardized to meet certain dimensional standards.

Connector systems typically comprise two complementary connectors, e.g., a plug (the male connector) and a jack (the female connector). Such connectors may be disposed in environments that are harsh and in which dust, dirt, moisture, and/or other contaminants are prone to enter the connection. Generally, the standardized connectors have fairly tight tolerances and do not permit the ingress of dirt or moisture under mild conditions, such as in homes and office buildings. However, in factories, motor vehicles, aerospace applications and outdoor settings, such as cellular antenna towers, in which moisture or dust may be significant, standard connectors may not be adequate to prevent the ingress of dust or moisture into the connectors. Additionally, such environments may be subject to harsh conditions, such as vibration and shock. When connectors are expected to be located in such harsh environments, it is desirable to place a protective housing or shell around the connectors. Connector systems that are used in such harsh environments typically have specially designed connectors, which may be expensive to manufacture.

There is a need for reliable, sealed connectors that can consistently and easily mate and unmate in harsh settings. There is a need for connectors for use in Ethernet or other network applications that can withstand harsh environments. There is a need for connectors that can be used in harsh environments and that utilize industry standard connectors.

BRIEF DESCRIPTION OF THE INVENTION

In one embodiment, a plug assembly is provided including a circular plug shell having a cavity configured to receive a modular plug connector therein. The circular plug shell is configured to be threadably coupled to a corresponding circular jack shell. An insert is loaded into the cavity of the circular plug shell. The insert includes an adapter having a one-piece body having a circular geometry. The body has a connector chamber configured to hold the modular plug connector therein.

In another embodiment, a plug assembly is provided including a circular plug shell having a cavity and a main wall extending into the cavity. The main wall has an opening therethrough. The circular plug shell is configured to receive a modular plug connector therein and is configured to be threadably coupled to a corresponding circular jack shell. An insert is loaded into the cavity of the circular plug shell. The insert includes a metal strap configured to hold the modular plug connector therein. The metal strap has walls configured to surround the modular plug connector. The metal strap has a latch retainer configured to hold a latch of the modular plug connector in a depressed position.

In a further embodiment, a plug assembly is provided that includes a circular plug shell having a cavity configured to receive a modular plug connector therein. The circular plug shell is configured to be threadably coupled to a corresponding circular jack shell. An insert is loaded into the cavity of the circular plug shell that includes an adapter having an upper housing and a lower housing coupled together. The upper housing has an upper connector chamber and the lower housing has a lower connector chamber cooperating to receive the modular plug connector therein. The upper connector chamber has a notch configured to receive a latch of the modular plug connector extending from a top of the modular plug connector, wherein the upper housing holds the latch in a depressed position when the modular plug connector is loaded into the upper connector chamber. The lower connector chamber is configured to engage the bottom of the modular plug connector opposite the top.

DETAILED DESCRIPTION OF THE INVENTION

Figure 1:
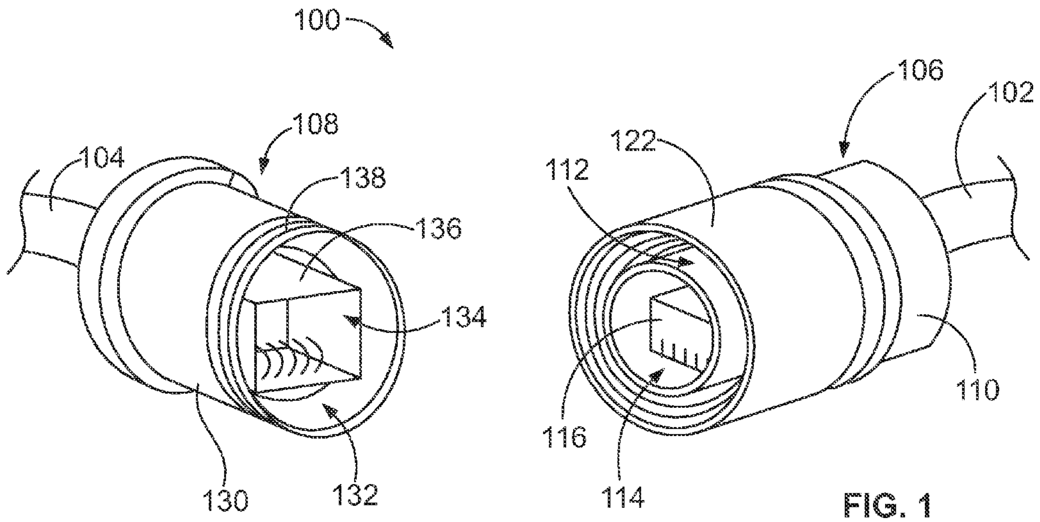
FIG. 1 illustrates a connector system formed in accordance with an exemplary embodiment.

FIG. 1 illustrates a connector system 100 formed in accordance with an exemplary embodiment. The connector system 100 is used to connect data communication cables 102, 104 together. For example, the data communication cables 102, 104 may be Ethernet cables transmitting data across a computer network. A plug assembly 106 is terminated to the end of the data communication cable 102. A receptacle assembly 108 is terminated to the end of the data communication cable 104. The plug assembly 106 and receptacle assembly 108 are mated together to create an electrical connection therebetween. Data is transmitted across the interface between the plug assembly 106 and the receptacle assembly 108.

In an exemplary embodiment, the plug assembly 106 and receptacle assembly 108 are designed for use in a rugged environment, such as an environment that is subject to extreme shock, vibration and the like. In one exemplary application, the connector system 100 is configured for use in military applications that require Ethernet data capability in harsh environments. Other applications include industrial applications, aerospace applications, marine applications, and the like. The subject matter herein may have application in other moderate environments, such as in building network systems. In the illustrated environment, the plug assembly 106 and the receptacle assembly 108 constitute high performance cylindrical connectors, designed in accordance with the MIL-DTL-38999 standard. Optionally, the receptacle assembly 108 may be panel mounted rather than cable mounted.

The plug assembly 106 includes a circular plug shell 110 having a cavity 112 therein. A plug insert 114 is received in the plug shell 110. The plug insert 114 holds a standard modular plug connector 116 within the plug shell 110. In the illustrated embodiment, the modular plug connector 116 constitutes an Ethernet connector, such as an RJ-45 connector. Alternative types of connectors may be used in alternative embodiments, including fiber-optic connectors. The plug insert 114 is held within an opening 118 (shown in FIG. 3) in a main wall 120 (shown in FIG. 3) of the plug shell 110. The plug insert 114 is held in the opening 118 such that the modular plug connector 116 is positioned within the cavity 112 for mating with the receptacle assembly 108. In an exemplary embodiment, the plug shell 110 is manufactured from a metal material and includes a threaded coupler 122 rotatably coupled thereto. The threaded coupler 122 is used to securely couple the plug assembly 106 to the receptacle assembly 108.

The receptacle assembly 108 includes a circular receptacle shell 130 having a cavity 132 therein. A jack insert 134 is received in the cavity 132. The jack insert 134 includes a modular jack connector 136 configured for mating with the modular plug connector 116. In the illustrated embodiment, the modular jack connector 136 constitutes an Ethernet connector, such as an RJ-45 connector. Alternative types of connectors may be used in alternative embodiments, including fiber-optic connectors. An outer surface of the receptacle shell 130 includes threads 138. The threaded coupler 122 is threaded onto the threads 138 to securely couple the plug assembly 106 to the receptacle assembly 108.

When the plug assembly is coupled to the receptacle assembly 108, the modular plug connector 116 is plugged into the modular jack connector 136 to make an electrical connection therebetween. Data is transmitted across the interface between the modular plug connector 116 and the modular jack connector 136. When the receptacle shell 130 and plug shell 110 are coupled together, a robust connection is provided between the plug assembly 106 and the receptacle assembly 108. The robust connection is capable of withstanding harsh environments, such as vibration and shock. The connection between the plug shell 110 and the receptacle shell 130, such as via the threaded coupler 122, withstands the forces exerted by the harsh environment, such that the interface between the modular plug connector 116 and the modular jack connector 136 is maintained, generally without any stress at the interface.

Figure 2:
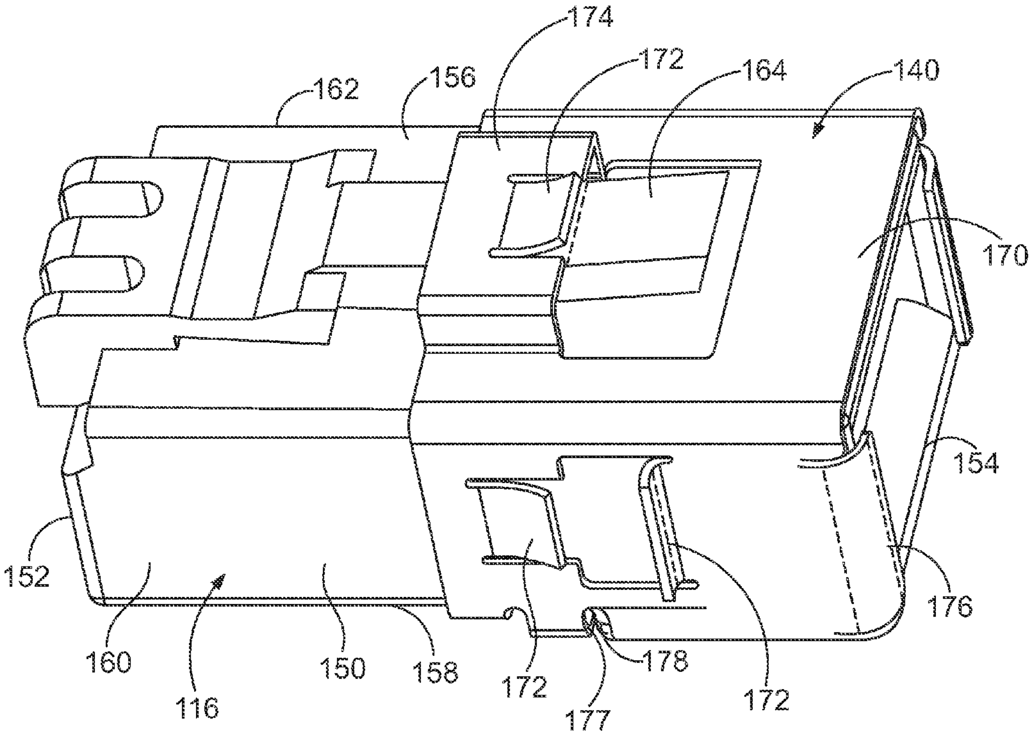
FIG. 2 is a top perspective view of a plug insert for the connector system.

FIG. 2 is a top perspective view of the plug insert 114 illustrating the modular plug connector 116 and a metal strap 140 of the plug insert 114 extending around the modular plug connector 116. The modular plug connector 116 includes a plug body 150 extending between a front or mating end 152 and a rear or cable end 154. The data communication cable 102 (shown in FIG. 1) extends from the cable end 154. The plug body 150 includes a top 156 and bottom 158 opposite the top 156. Sides 160, 162 extend between the top and bottom 156, 158, respectively. The plug body 150 holds a plurality of contacts not shown therein that are used to electrically connect with the modular jack connector 136. The contacts within the plug body 150 are electrically connected to corresponding wires (not shown) of the data communication cable 102.

A deflectable latch 164 extends from the plug body 150 at the top 156 proximate to the mating end 152. The latch is deflectable towards the top 156. In conventional systems, the latch 164 may be used to secure the modular plug connector 116 within the modular jack connector 136 (shown in FIG. 1). In an exemplary embodiment, when used within the plug insert 114, the latch 164 is held in a depressed or deactivated state, such that the latch 164 is not used to secure the modular plug connector 116 within the modular jack connector 136. Rather, a separable interface is maintained between the modular plug connector 116 and the modular jack connector 136 allowing the modular plug connector 116 to be freely inserted into and withdrawn from the modular jack connector 136 without the latch 164 engaging or disengaging the modular jack connector 136. As described above, the threaded coupler 122 (shown in FIG. 1) is used to securely couple the plug assembly 106 to the receptacle assembly 108 (both shown in FIG. 1). When the plug assembly 106 is securely coupled to the receptacle assembly 108, the modular plug connector 116 is in electrical contact with the modular jack connector 136. The latch 164 is not needed to secure the modular plug connector 116 with the modular jack connector 136.

The metal strap 140 is coupled to the plug body 150. The metal strap 140 includes a plurality of walls 170 that extend around the plug body 150. In an exemplary embodiment, the metal strap 140 fits tightly around the plug body 150. The metal strap 140 may be a stamped and formed component wrapping at least partially around the plug body 150. Optionally, the metal strap may entirely circumferentially surround the plug body 150.

The metal strap 140 includes retention tabs 172 extending from the walls 170. The retention tabs 172 extend outward from the walls 170. The retention tabs 172 are configured to engage the plug shell 110 to hold the plug insert 114 within the opening 118 (shown in FIG. 1). Optionally, the retention tabs 172 are deflectable, and are configured to spring outward when the plug insert 114 is loaded into the plug shell 110.

The metal strap 140 includes a theft retainer 174 extending from one of the walls 170 extending along the top 156. The latch retainer 174 is configured to hold the latch 164 in the depressed position. For example, when the metal strap 140 is coupled to the plug body 150, the latch retainer 174 extends over the latch 164 and forces the latch 164 to be pressed downward toward the top 156.

The metal strap 140 includes a plurality of blocking walls 176 extending from corresponding walls 170. The blocking walls 176 engage the plug body 150 of the modular plug connector 116. The blocking walls 176 hold the relative position of the modular plug connector 116 with respect to the metal strap 140. In an exemplary embodiment, the blocking walls 176 are wrapped around the cable end 154 to hold the metal strap 140 from sliding forward along the plug body 150. The metal strap 140 also includes a lower blocking wall 177 extending along the bottom 158 generally forward of a shoulder 178 of the plug body 150. The lower blocking wall 177 stops the metal strap 140 from sliding rearward along the plug body 150. As such, the plug body 150 is captured between the rear blocking walls 176 and lower blocking wall 177. Other blocking walls may be provided at different locations in alternative embodiments. The blocking walls 176 may extend into the plug body in alternative embodiments. The blocking walls 176 may include barbs, springs, or other features that may engage the plug body 150 to hold the relative position of the metal strap 140 with respect to the plug body 150, such as by an interference engagement.

Figure 3:
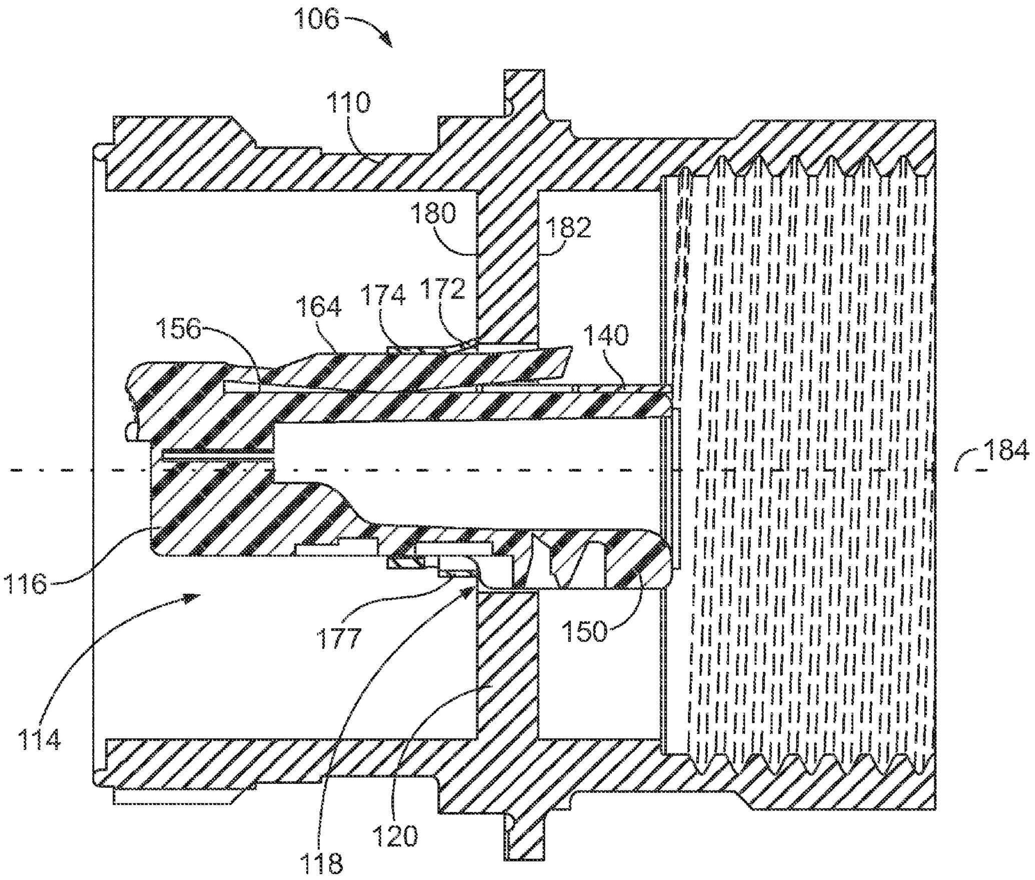
FIG. 3 is a side cut-away view of a plug assembly for the connector system.
Figure 4:
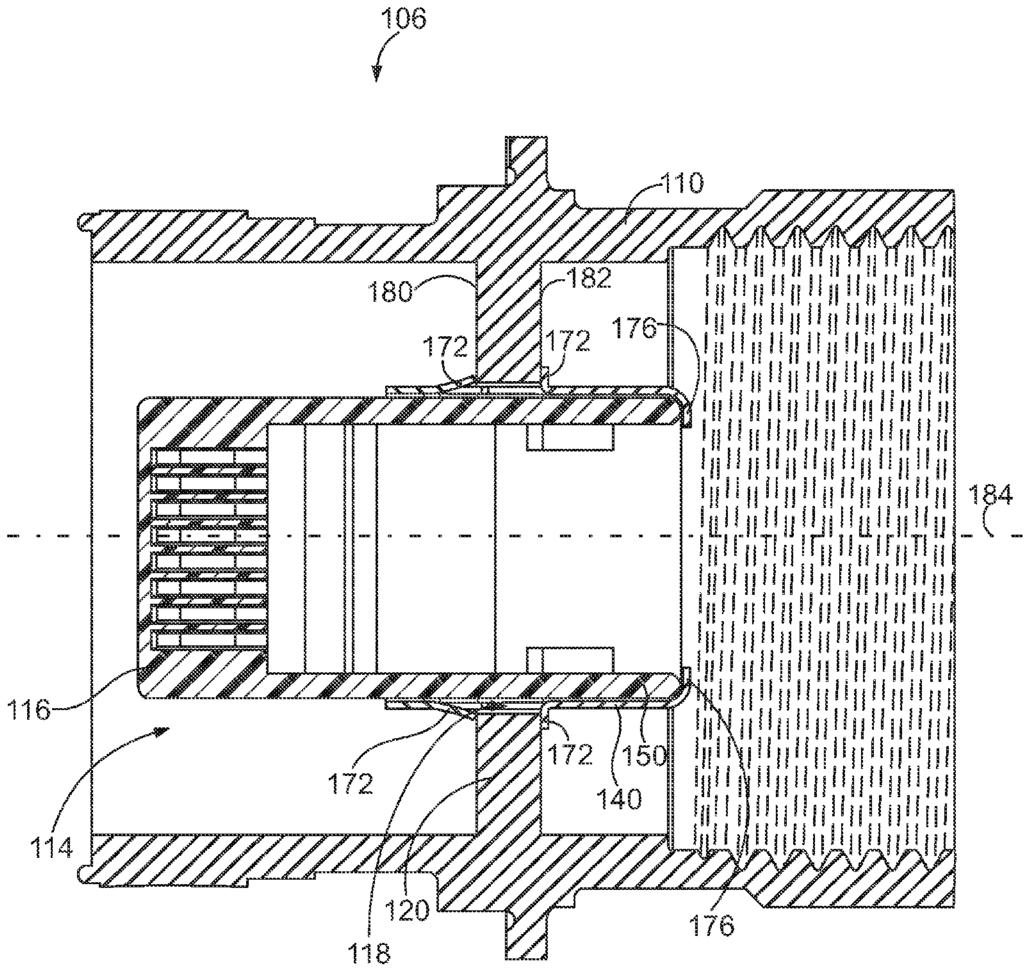
FIG. 4 is a top cut-away view of the plug assembly shown in FIG. 3.

FIG. 3 is a side cut-away view of the plug assembly 106. FIG. 4 is a top cut-away view of the plug assembly 106. The plug insert 114 is illustrated assembled within the plug shell 110. The plug insert 114, including the metal strap 140 and the modular plug connector 116, is loaded into the opening 118 in the main wall 120. The metal strap 140 engages the main wall 120 to secure the plug insert 114 within the opening 118. The retention tabs 172 are flared outward to capture the main wall 120. For example, some of the retention tabs 172 may engage a front surface 180 of the main wall 120, while other retention tabs 172 may engage a rear surface 182 of the main wall 120. The main wall 120 is captured between such retention tabs 172.

The modular plug connector 116 is held within the opening 118 by the metal strap 140. The latch retainer 174 holds the latch 164 in the depressed position (shown in FIG. 3). The latch 164 extends through the opening 118 and the main wall 120 serves as a backup feature to hold the latch 164 in the depressed position, should the latch retainer 174 fail to operate or hold the latch 164 close enough to the top 156 of the plug body 150.

The metal strap 140 is held in place relative to the main wall 120 by the retention tabs 172. The metal strap 140 is held longitudinally within the plug shell 110 along a longitudinal axis 184 of the plug shell 110. The modular plug connector 116 is held longitudinally within the metal strap 140 by the blocking walls 176. In an exemplary embodiment, the plug insert 114 and modular plug connector 116 are loaded into the plug shell 110 along the longitudinal axis 184. The plug insert 114 and modular plug connector 116 are loaded through the opening 118 until the rear retention tabs 172 engage the rear surface 182. At such time, the front retention tabs 172 spring outward and are configured to engage the front surface 180 of the main wall 120 to resist removal of the plug insert 114 from the opening 118.

Figure 5:
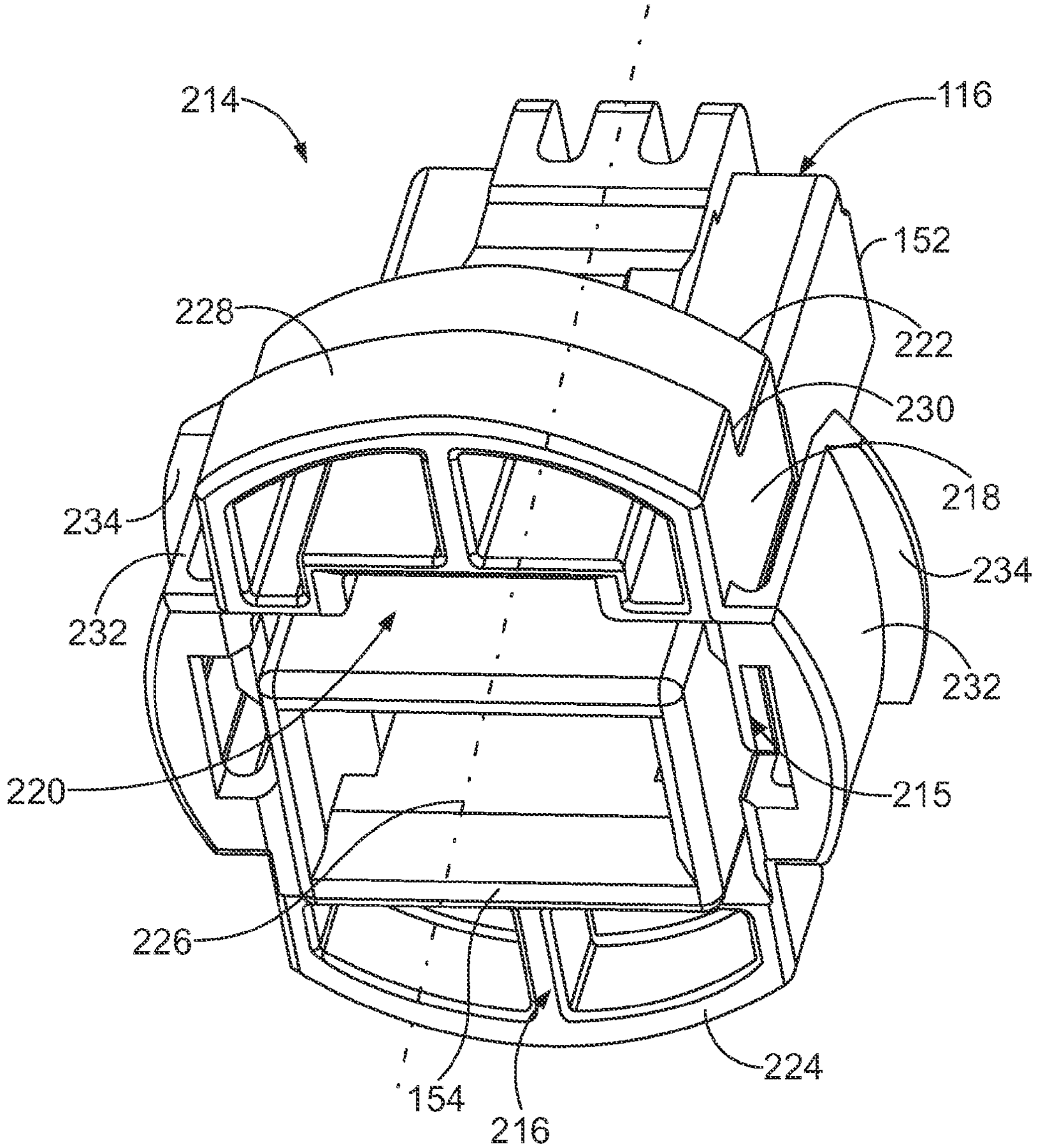
FIG. 5 is rear perspective view of an alternative plug insert for the connector system.

FIG. 5 is a rear perspective view of an alternative plug insert 214 that uses the modular plug connector 116 and a metal strap 215. The metal strap 215 may be similar to the metal strap 140 (shown in FIG. 2). The plug insert 214 includes an adapter 216 that holds the modular plug connector 116 and metal strap 215.

The adapter 216 includes a one-piece body 218 having a generally circular geometry. The body 218 has a connector chamber 220 therein that receives the modular plug connector 116 and metal strap 215. The body 218 extends between a front end 222 and a back end 224. The connector chamber 220 extends between the front end 222 and the back end 224 along a chamber axis 226. The connector chamber 220 receives the modular plug connector 116 and metal strap 215 through the back end 224 in a direction along the chamber axis 226. In an exemplary embodiment, the body 218 is manufactured from a dielectric material such as a plastic material. The body 218 entirely circumferentially surrounds the rear end 154 of the modular plug connector 116. The front end 152 of the modular plug connector 116 extends forward from the front end 222.

The body 218 includes one or more flange(s) 228 at the back end 224. The flanges 228 have forward facing shoulders 230. Optionally, flanges 228 may be provided at both the top and bottom of the body 218. The body 218 has a curved top end and a curved bottom end. The sides of the body 218 are generally flat and extend between the top end and the bottom end.

Deflectable latches 232 extend outward from the sides of the body 218. Optionally, an outer surface of the deflectable latches 232 may be curved and have a radius of curvature that coincides with the curvature of the top and bottom ends of the body 218. The deflectable latches 232 extend from the body 218 proximate to the back end 224 and extend forward towards the front end 222. The deflectable latches 232 are configured to be deflected towards the sides of the body 218. The deflectable latches 232 include catch surfaces 234 extending radially outward from the distal ends of the deflectable latches 232.

Figure 6:
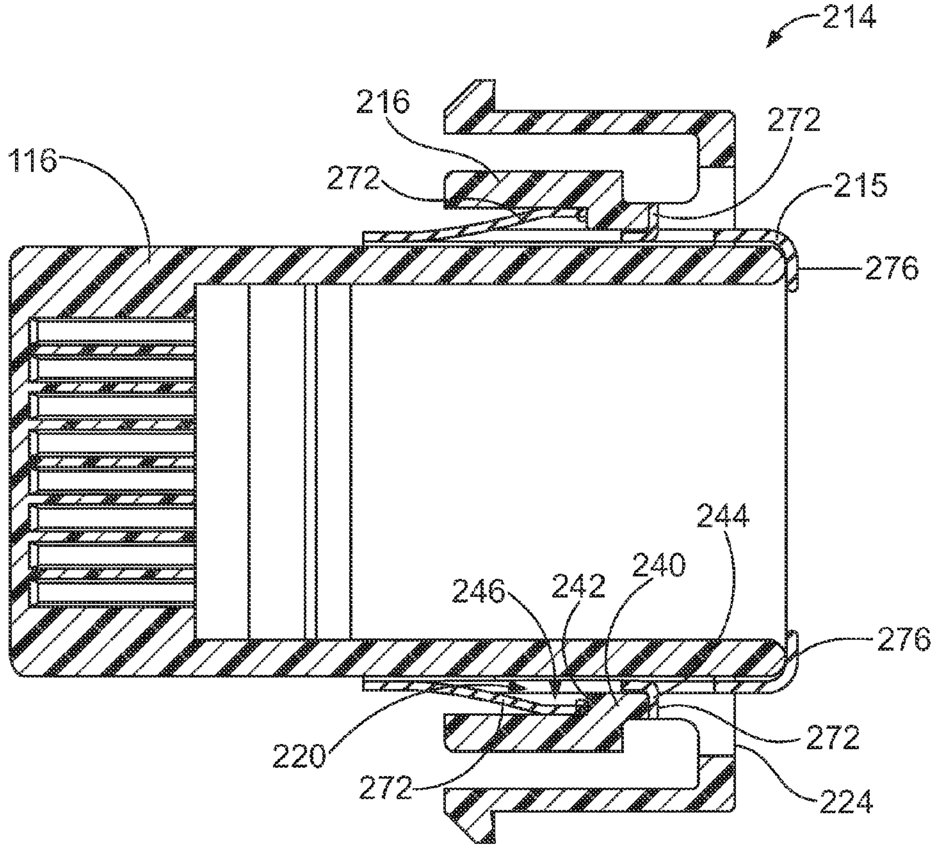
FIG. 6 is a cross-sectional view of the plug insert shown in FIG. 5.

FIG. 6 is a cross-sectional view of the plug insert 214, showing the adapter 216 with the modular plug connector 116 and metal strap 215 loaded into the adapter 216. In an exemplary embodiment, the adapter 216 includes an inner wall 240 extending into the connector chamber 220. The inner wall 240 includes a front surface 242 and a rear surface 244. The modular plug connector 116 and metal strap 215 are loaded into the connector chamber 220 through the back end 224 until retention tabs 272 of the metal strap 215 engage the inner wall 240. The rearward retention tabs 272 engage the rear surface 244. When the modular plug connector 116 and metal strap 215 are fully loaded into the connector chamber 220, the forward retention tabs 272 spring outward into recesses 246 positioned forward of the inner wall 240. The retention tabs 272 engage the front surface 242 to stop the modular plug connector 116 and metal strap 215 from being removed from the connector chamber 220. Once the modular plug connector 116 and metal strap 215 are secured within the adapter 216, the components together define the plug insert 214 which can be loaded into a circular plug shell 250 (shown in FIG. 7) as a unit. The metal strap 215 includes a plurality of blocking walls 276. The blocking walls 276 engage the plug body 150 of the modular plug connector 116. The blocking walls 276 hold the relative position of the modular plug connector 116 with respect to the metal strap 215.

Figure 7:
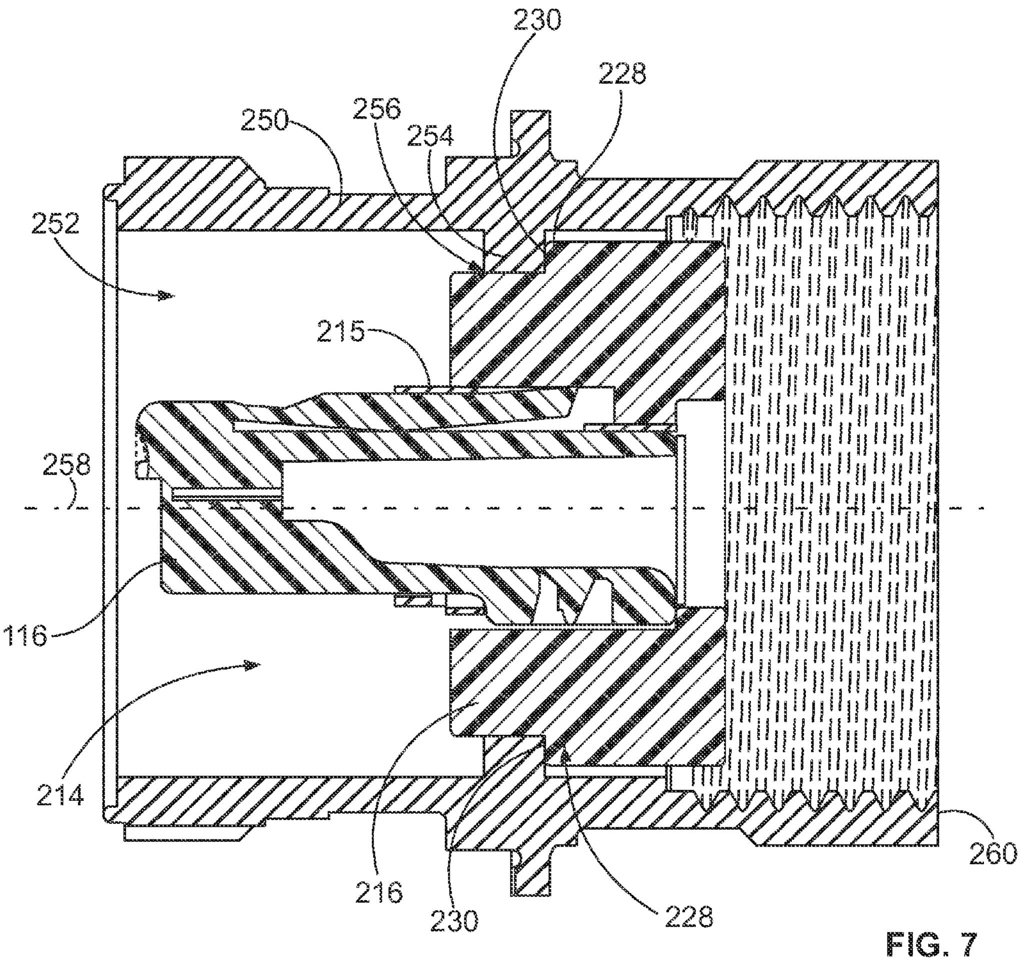
FIG. 7 is a cross-sectional view of the plug insert shown in FIGS. 5 and 6 loaded into a circular plug shell.

FIG. 7 is a cross-sectional view of the plug insert 214 loaded into the circular plug shell 250. The plug shell 250 may be similar to the plug shell 110 (shown in FIG. 3), however the plug shell 250 is configured to receive the plug insert 214, as opposed to the plug shell 110, which is configured to the receive the modular plug connector 116 and metal strap 215 directly therein. The plug shell 250 receives the adapter 216 in addition to the modular plug connector 116 and metal strap 215.

The plug shell 250 includes a cavity 252. A main wall 254 extends into the cavity 252 and includes an opening 256 therethrough. The cavity 252 extends along a longitudinal axis 258. The plug insert 214 is loaded into the plug shell 250 along the longitudinal axis 258 through a rear end 260 of the plug shell 250. The plug insert 214 is loaded into the plug shell 250 until the adapter 216 engages the main wall 254. The flange 228 is loaded against the main wall 254 such that the shoulder 230 engages the rear surface of the main wall 254.

In the loaded position, the deflectable latches 232 (shown in FIG. 5) are loaded through the opening 256 and the catch surfaces 234 (shown in FIG. 5) engage a front surface of the main wall 254. The adapter 216 is held within the opening 256 by the deflectable latches 232 and flange(s) 228. When the plug insert 214 is coupled to the plug shell 250, the modular plug connector 116 is arranged within the cavity 252 for mating with the modular jack connector 136 (shown in FIG. 1).

Figure 8:
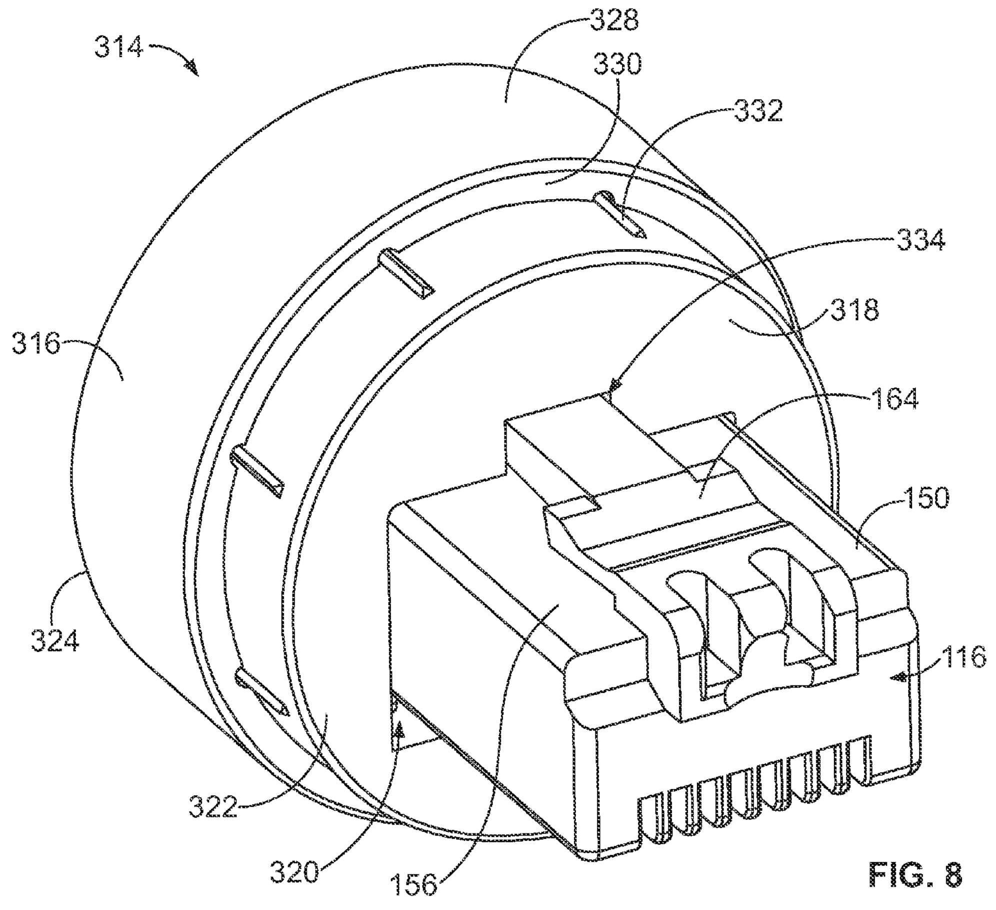
FIG. 8 is a front perspective view of an alternative plug insert for the connector system.
Figure 9:
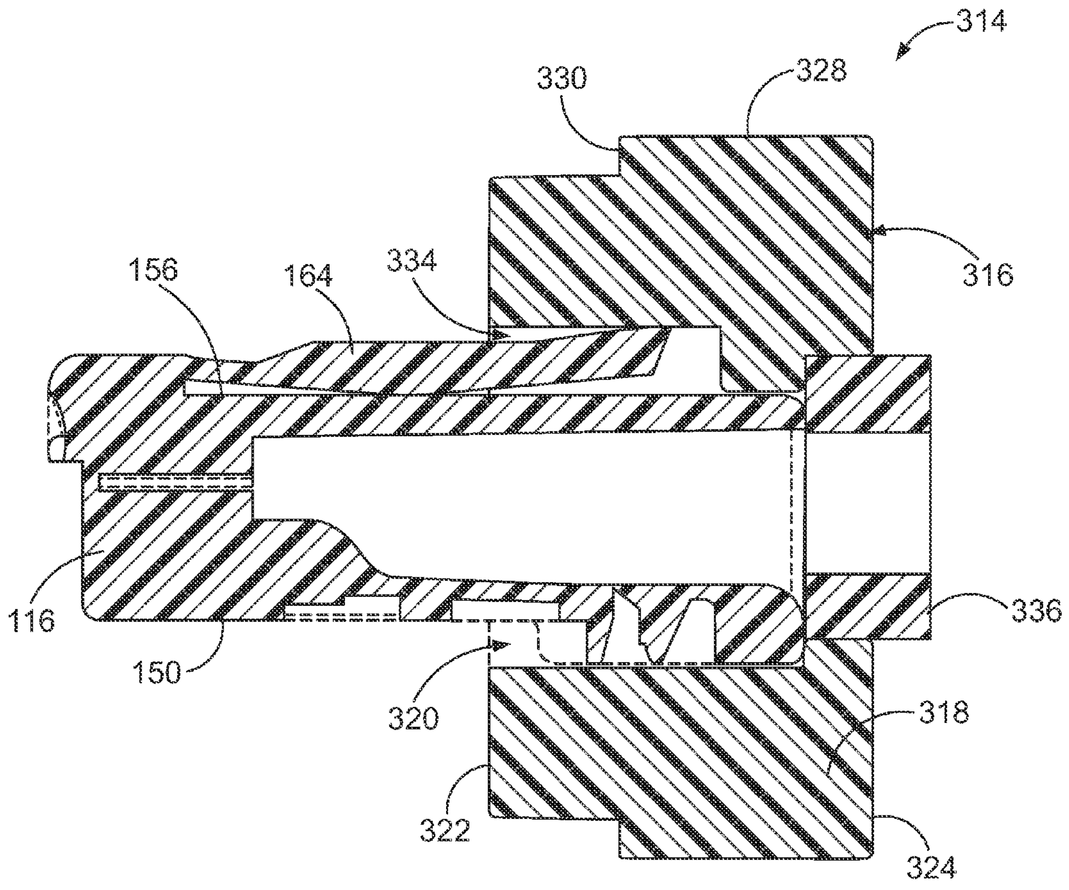
FIG. 9 is a cross sectional view of the plug insert shown in FIG. 8.

FIG. 8 is a front perspective view of an alternative plug insert 314 that is configured to be loaded into a circular plug shell (not shown) to define a plug assembly. FIG. 9 is a cross sectional view of the plug insert 314. The plug insert 314 includes an adapter 316 that holds the modular plug connector 116. In an exemplary embodiment, the adapter 316 is configured to hold the modular plug connector 116 without the use of a metal strap, such as the metal strap 140 (shown in FIG. 2).

The adapter 316 includes a one-piece body 318 that has a generally circular geometry. The body 318 has a connector chamber 320 extending therethrough that receives the modular plug connector 116. The body 318 extends between a front end 322 and a back end 324. The connector chamber 320 is open between the front end 322 and the back end 324. Optionally, the modular plug connector 116 is loaded into the connector chamber 320 through the front end 322 and the cable extends through the back end 324. The body 318 includes a circumferential flange 328 proximate to the back end 324. The flange 328 has a forward facing shoulder 330.

In an exemplary embodiment, the body 318 includes a plurality of crush ribs 332 disposed intermittently about the outer surface of the body 318. The crush ribs 332 are provided forward of the flange 328. In an exemplary embodiment, the adapter 316 is loaded into a plug shell and the crush ribs 332 are used to hold the adapter 316 within the plug shell by an interference fit, such as within an opening in a main wall of the plug shell.

The modular plug connector 116 is held within the connector chamber 320 such that the latch 164 is held in a depressed position. The connector chamber 320 includes a latch slot 334 along a top of the connector chamber 320 that receives the latch 164. When the latch 164 is positioned within the latch slot 334, the latch 164 is held in a deflected position generally against the top 156 of the plug body 150.

The modular plug connector 116 is held within the connector chamber 320 such that the modular plug connector 116 does not move longitudinally within the connector chamber 320 in the direction of the front end 322. A separate component, such as a gland strain relief 336 is used to hold the modular plug connector 116 within the adapter 316, to prevent movement of the plug. For example, when the gland strain relief 336 is tightened down on the cable during assembly, the gland strain relief 336 may be pressed against the back end 324 of the body 318 holding the modular plug connector 116 with respect to the adapter 316. Alternative securing features may be used in alternative embodiments to hold the modular plug connector 116 within the connector chamber 320. For example, a metal strap may be used and held within the connector chamber 320 in a similar manner as the metal strap 215 was held in the connector chamber 220 (shown in FIG. 5). In other alternative embodiments, other features, such as crush ribs, fasteners, rubber gaskets or other types of securing features may be used to hold the modular plug connector 116 within the connector chamber 220.

Figure 10:
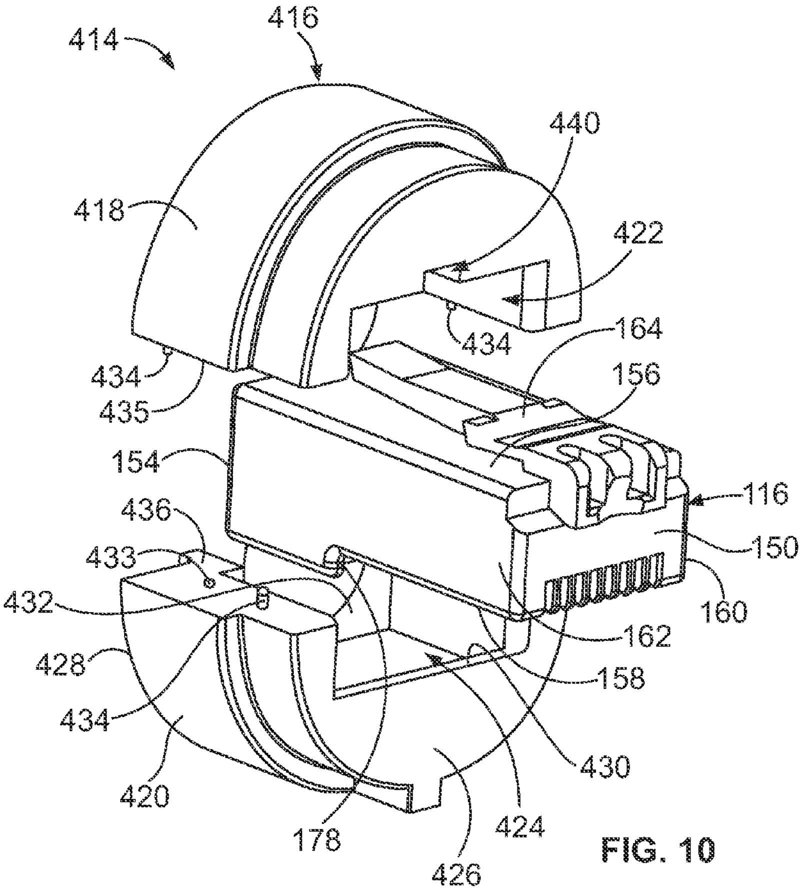
FIG. 10 is an exploded view of another alternative plug insert for the connector system.
Figure 11:
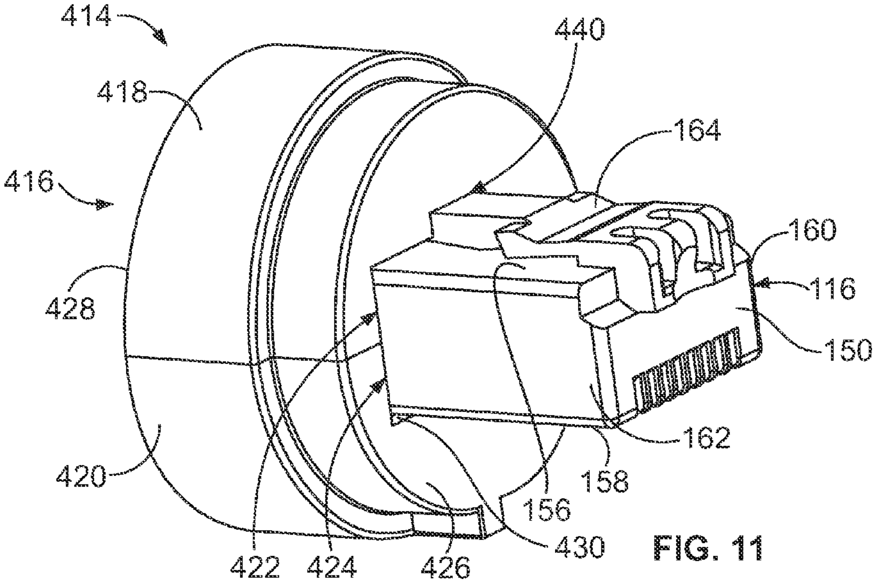
FIG. 11 is an assembled front perspective view of the plug insert shown in FIG. 10.
Figure 12:
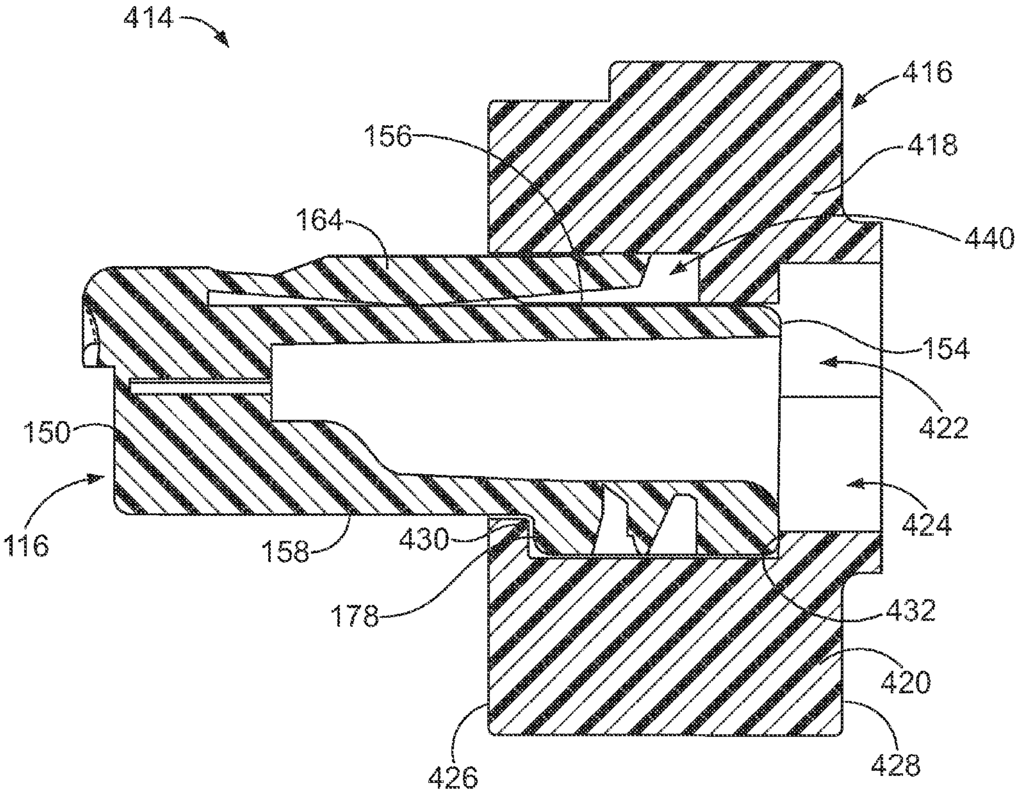
FIG. 12 is a cross-sectional view of the plug insert shown in FIG. 11.

FIG. 10 is an exploded view of an alternative plug insert 414. FIG. 11 is an assembled front perspective of the plug insert 414. FIG. 12 is a cross-sectional view of the plug insert 414.

The plug insert 414 includes an adapter 416 that is configured to hold the modular plug connector 116. The adapter 416 and modular plug connector 116 are configured to be loaded into a circular plug shell (not shown) to define a plug assembly. The plug insert 414 includes a two piece adapter 416 having an upper housing 418 and a lower housing 420 that are joined together. The upper housing 418 includes an upper connector chamber 422 and the lower housing 420 includes a lower connector chamber 424 that cooperates with the upper connector chamber 422 to receive the modular plug connector 116 therein.

The adapter 416 extends between a front end 426 and a back end 428. The lower housing 420 has a front blocking wall 430 proximate to the front end 426 and a rear blocking wall 432 proximate to the back end 428. The modular plug connector 116 is loaded into the lower connector chamber 424 such that the front blocking wall 430 blocks forward movement of the modular plug connector 116 within the lower connector chamber 424 and the rear blocking wall 432 blocks rearward movement of the modular plug connector 116 within the lower connector chamber 424. For example, the front blocking wall 430 is positioned forward of the shoulder 178 at the bottom 158 of the plug body 150. The shoulder 178 is restricted from forward movement by the front blocking wall 430. The rear blocking wall 432 is positioned behind the rear end 154 of the plug body 150. The rear end 154 is restricted from rearward movement by the rear blocking wall 432.

The upper housing 418 is semicircular shaped and extends around portions of both sides 160, 162 of the modular plug connector 116 and the top 156 of the modular plug connector 116. The upper housing 418 extends across the latch 164 of the modular plug connector 116. The lower housing 420 is semicircular shaped and extends around portions of both sides 160, 162 of the modular plug connector 116 and the bottom 158 of the modular plug connector 116.

In an exemplary embodiment, the upper and lower housings 418, 420 include securing features for securing the upper and lower housings 418, 420 together. In the illustrated embodiment, the upper and lower housings 418 include openings 433 into, and posts 434 extending from, a bottom surface 435 of the upper housing 418 and a top surface 436 of the lower housing 420. The posts 434 constitute securing features that are received in the openings 433 to hold the upper and lower housings 418, 420 together. For example, the posts 434 may be held in the openings 433 by an interference fit. Other types of securing features may be used in alternative embodiments to hold the upper and lower housings 418, 420 together, such as latches, fasteners, and the like.

The upper connector chamber 422 includes a latch slot 440 extending along a top of the upper connector chamber 422. The latch slot 440 is configured to receive the latch 164 of the modular plug connector 116. As shown in FIG. 12, when the latch 164 is positioned within the latch slot 440, the upper housing 418 holds the latch 164 in a depressed position. During assembly, the modular plug connector 116 is loaded into the lower connector chamber 424. The upper housing 418 is then coupled to the lower housing 420 over the modular plug connector 116. As the upper housing 418 is lowered onto the lower housing 420, the upper housing 418 presses the latch 164 towards the top 156 of the plug body 150. When the upper and lower housings 418, 420 are secured together, the latch 164 is held in the depressed position.

Figure 13:
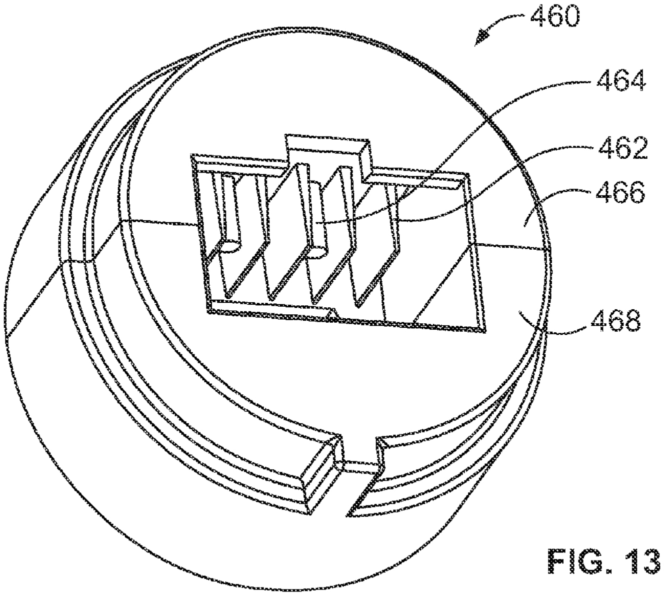
FIG. 13 is front perspective view of an alternative adapter for the connector system.

FIG. 13 is a front perspective view of an alternative adapter 460 configured to hold the modular plug connector 116 (shown in FIG. 1) and configured to be received in a plug shell (not shown) to define a plug assembly. The adapter 460 is similar to the adapter 416, however the adapter 460 includes a plurality of crush ribs 462 and posts 464 within an upper housing 466 and a lower housing 468. The crush ribs 462 and posts 464 operate to engage and position the modular plug connector 116 within the lower housing 468 of the adapter 460.

Figure 14:
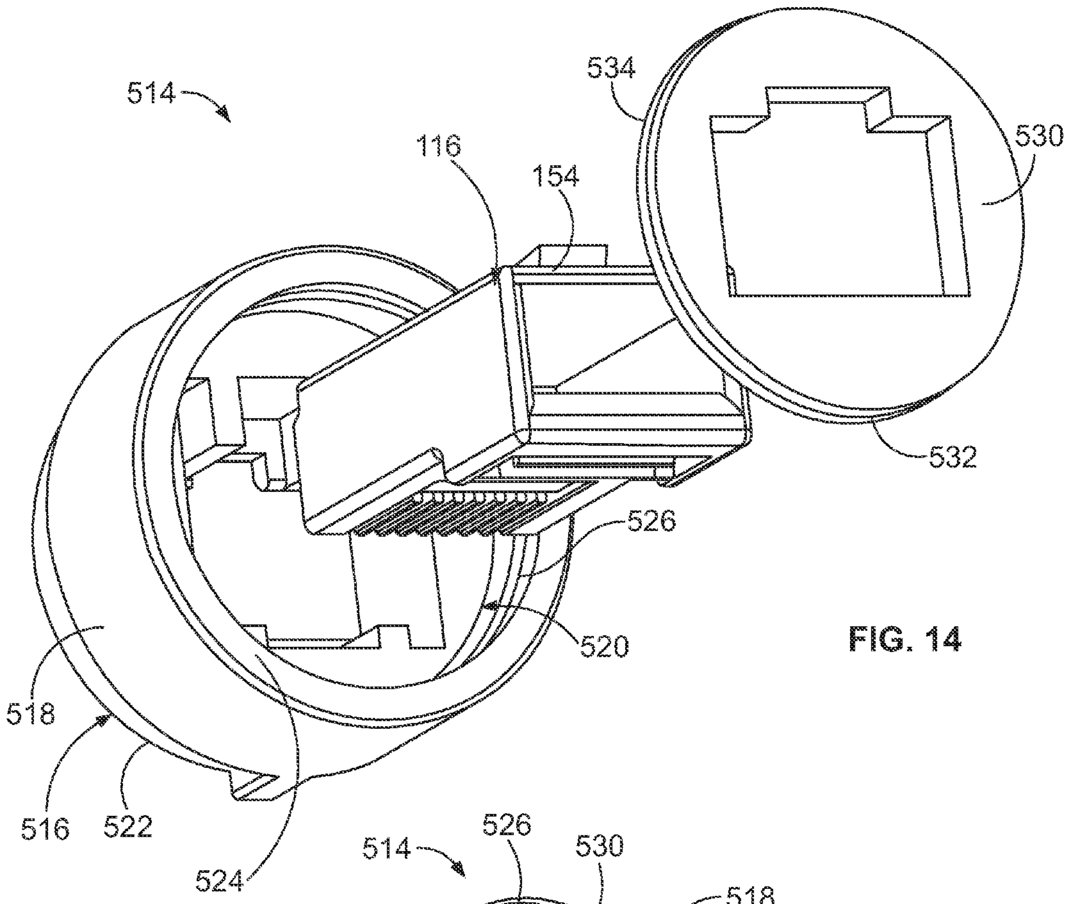
FIG. 14 is a rear perspective of another alternative plug insert for the connector system.
Figure 15:
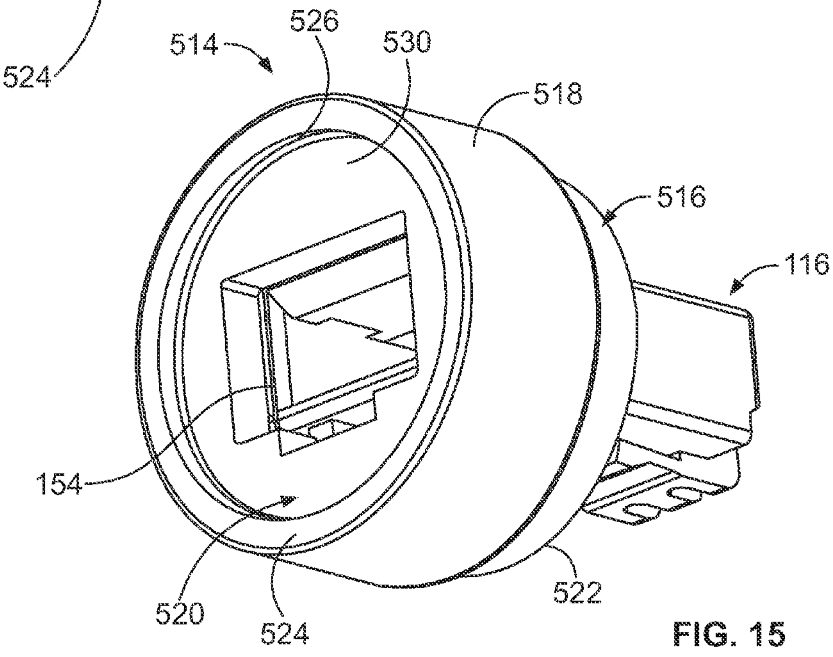
FIG. 15 illustrates the plug insert shown in FIG. 14 in an assembled state.

FIG. 14 is a rear perspective of an alternative plug insert 514 in an exploded state. FIG. 15 is a rear perspective view of the plug insert 514 in an assembled state. The plug insert 514 includes an adapter 516 that holds the modular plug connector 116 therein. The plug insert 514 is configured to be received in a circular plug shell to define a plug assembly. The adapter 516 includes a one-piece body 518 having a connector chamber 520 therein that receives the modular plug connector 116. The body 518 includes a front end 522 and back end 524. In an exemplary embodiment, the body 518 at the back end 524 is threaded and includes a plurality of threads 526.

During assembly, the modular plug connector 116 is loaded into the connector chamber 520 through the back end 524. Once positioned therein, a plate 530 is coupled to the body 518 at the back end 524. The plate 530 is generally circular in shape and includes outer threads 532 along an outer perimeter thereof. The plate 530 is threadably coupled to the back end 524 of the adapter 516. The plate 530 is threadably coupled to the adapter 516 until the plate 530 is in a blocking position to hold the modular plug connector 116 within the connector chamber 520. For example, the plate 530 may be threadably coupled to the adapter 516 until an inner surface 534 of the plate 530 engages the rear end 154 of the modular plug connector 116. The plate 530 stops removal of the modular plug connector 116 from the connector chamber 520.

Figure 16:
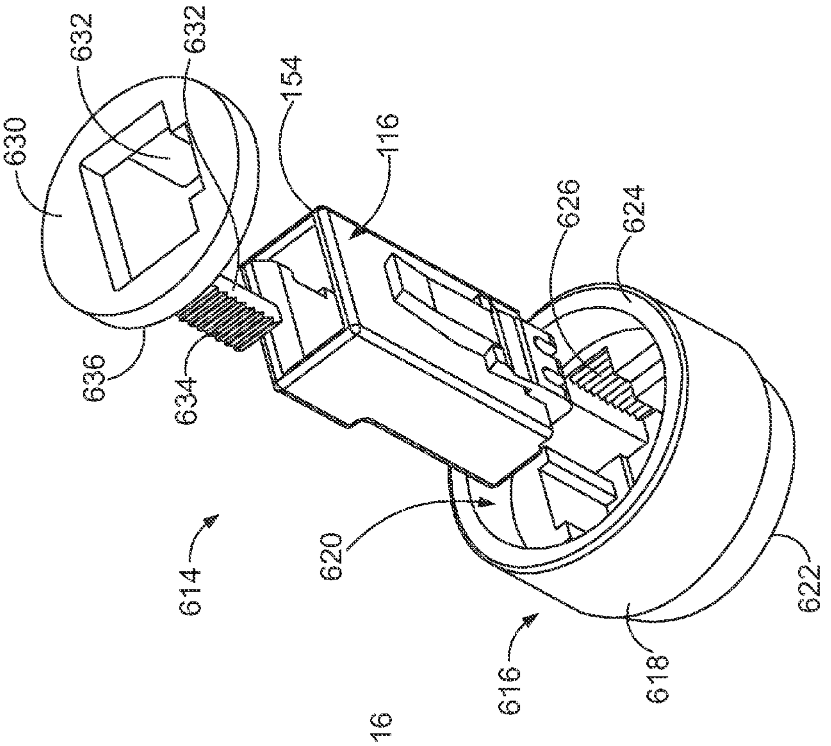
FIG. 16 is a rear perspective view of another alternative plug insert for the connector system.

FIG. 16 is a rear perspective view of an alternative plug insert 614. The plug insert 614 includes an adapter 616 that holds the modular plug connector 116 therein. The plug insert 614 is configured to be received in a circular plug shell to define a plug assembly. The adapter 616 includes a one-piece body 618 having a connector chamber 620 therein that receives the modular plug connector 116. The body 618 includes a front end 622 and back end 624. In an exemplary embodiment, the body 618 has a plurality of teeth 626 along sides of the connector chamber 620. The teeth 626 are positioned proximate to the front end 622.

During assembly, the modular plug connector 116 is loaded into the connector chamber 620 through the back end 624. Once positioned therein, a plate 630 is coupled to the body 618 at the back end 624. The plate 630 is generally circular in shape and includes tabs 632 extending forward from the plate 630. The plate 630 is loaded into the connector chamber 620 through the back end 624 of the adapter 616. The tabs 632 have outward facing teeth 634 that engage the teeth 626 of the adapter 616 to hold the plate 630 in the connector chamber 620. The plate 630 is loaded into the adapter 616 until the plate 630 is in a blocking position to hold the modular plug connector 116 within the connector chamber 620. For example, the plate 630 may be pushed into the connector chamber 620 until an inner surface 636 of the plate 630 engages the rear end 154 of the modular plug connector 116. As the plate 630 is pushed into the connector chamber 620, the teeth 634 engage the teeth 626 to stop the plate 630 from moving rearward and backing out of the connector chamber 620. The plate 630 stops removal of the modular plug connector 116 from the connector chamber 620.

Figure 17:
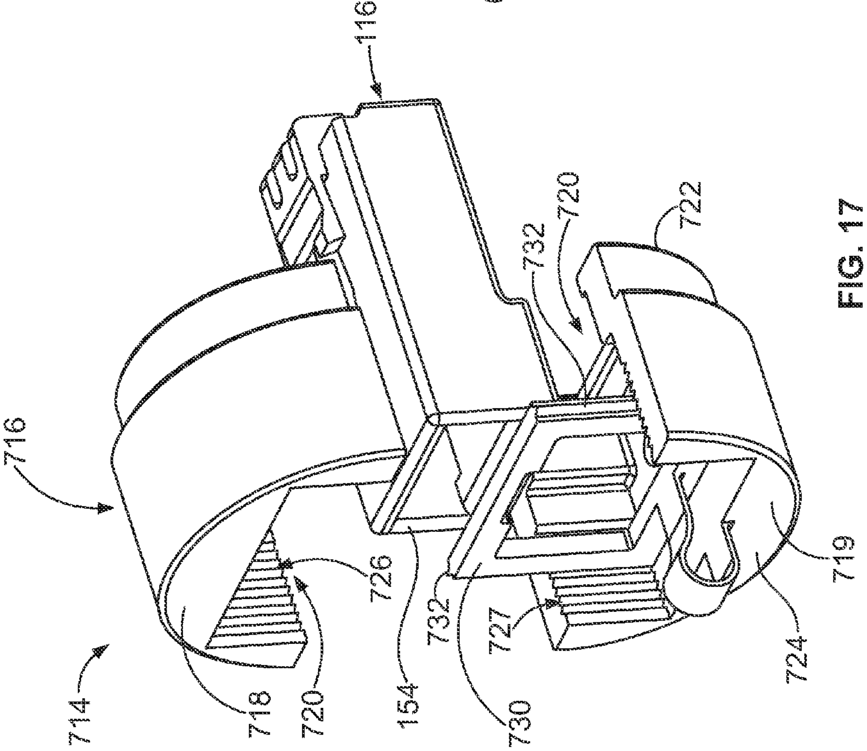
FIG. 17 is a rear perspective view of yet another alternative plug insert for the connector system.

FIG. 17 is a rear perspective view of an alternative plug insert 714. The plug insert 714 includes an adapter 716 that holds the modular plug connector 116 therein. The plug insert 714 is configured to be received in a circular plug shell to define a plug assembly. The adapter 716 includes a two-piece body defined by an upper housing 718 and a lower housing 719. The upper and lower housings 718, 719 are coupled together and define a connector chamber 720 therein that receives the modular plug connector 116. The adapter 716 has a front end 722 and back end 724. In an exemplary embodiment, the upper and lower housings 718, 719 have a plurality of channels 726, 727 along sides of the connector chamber 720. The channels 726 are positioned proximate to the front end 722.

During assembly, the modular plug connector 116 is loaded into the lower housing 719 through the top of the lower housing 719. Once positioned therein, a plate 730 is coupled to the lower housing 719. The plate 730 is generally rectangular in shape and includes tabs 732 extending from the sides thereof. The tabs 732 are received in corresponding channels 727 to hold the plate 730 in the lower housing 719. The plate 730 is positioned immediately behind the modular plug connector 116 so that the plate 730 is in a blocking position to hold the modular plug connector 116 within the connector chamber 720. Once positioned, the upper housing 718 is coupled to the lower housing 719 over the modular plug connector 116 and the plate 730. As the lower housing 719 is lowered into position, the tabs 732 are received in corresponding channels 726 of the upper housing 718. The plate 730 stops removal of the modular plug connector 116 from the connector chamber 720.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain English equivalents of the respective terms "comprising" and "wherein." Moreover, in the following claims, the terms "first," "second." and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A plug assembly comprising:

a circular plug shell having a cavity configured to receive a modular plug connector therein, the circular plug shell having a threaded coupler at a mating end, the threaded coupler being configured to be threadably coupled to a corresponding circular jack shell; and an insert loaded into the cavity of the circular plug shell, the insert comprising an adapter having a one-piece body having a circular geometry, the body having a connector chamber configured to hold the modular plug connector therein, the body being configured to surround a plug body and a latch of the modular plug connector, the insert being loaded into the cavity such that the plug shell entirely peripherally surrounds the insert and the modular plug connector along an entire length of the insert and the modular plug connector.

2. The assembly of claim 1, wherein the insert includes a metal strap configured to hold the modular plug connector therein, the metal strap having stamped and formed walls configured to intimately surround the modular plug connector, the metal strap having retention tabs extending from the walls, the retention tabs securing the metal strap within the connector chamber of the adapter, the metal strap having a latch retainer configured to hold a latch of the modular plug connector in a depressed position.

3. The assembly of claim 1, wherein the insert includes a metal strap configured to hold the modular plug connector therein, the metal strap having stamped and formed walls configured to intimately surround the modular plug connector, the metal strap having blocking walls engaging the modular plug connector to hold the relative position of the modular plug connector with respect to the metal strap, the metal strap having retention tabs extending from the walls, the retention tabs securing the metal strap within the connector chamber of the adapter.

4. The assembly of claim 1, wherein the circular plug shell includes a main wall extending into the cavity and dividing the cavity into a front cavity and a rear cavity, the main wall having an opening, the adapter being held within the opening such that the adapter and the modular plug connector are received in the front and rear cavities and peripherally surrounded by the plug shell along the entire length of the adapter and modular plug connector.

5. The assembly of claim 1, wherein the adapter entirely circumferentially surrounds the modular plug connector.

6. The assembly of claim 1, wherein the adapter includes a front end and a back end with the connector chamber extending therebetween along a chamber axis, the connector chamber receiving the modular plug connector in a direction along the chamber axis.

7. The assembly of claim 1, wherein the adapter further comprises a plate received in the connector chamber, the plate holds the modular plug connector within the connector chamber.

8. The assembly of claim 1, wherein the circular plug shell extends between a front and a rear, the circular plug shell includes a main wall extending into the cavity and positioned between the front and the rear, the main wall having an opening, the adapter having deflectable latches engaging the opening to hold the adapter in the main wall, the adaptor being positioned within the opening such that the front of the circular plug shell is positioned at or forward of a front end of the modular plug connector, the adaptor being positioned within the opening such that the rear of the circular plug shell is positioned at or rearward of a rear end of the modular plug connector.

9. The assembly of claim 1, wherein the circular plug shell includes a main wall extending into the cavity, the main wall having an opening, the adapter having crush ribs extending from an outer perimeter thereof, the crush ribs engaging the opening to hold the adapter in the main wall.

10. The assembly of claim 1, further comprising a modular plug connector received in the adapter, the modular plug connector having a latch held in a depressed position by the adapter.

11. A plug assembly comprising:

a circular plug shell having a cavity and a main wall extending into the cavity, the main wall having an opening therethrough, the circular plug shell being configured to receive a modular plug connector therein, the circular plug shell being configured to be threadably coupled to a corresponding circular jack shell; and an insert loaded into the cavity of the circular plug shell, the insert comprising a stamped and formed metal strap having a one-piece body having a connector chamber configured to hold the modular plug connector therein, the metal strap having stamped and formed walls configured to intimately surround the modular plug connector, the metal strap having a latch retainer configured to hold a latch of the modular plug connector in a depressed position, the insert being loaded into the cavity such that the plug shell entirely peripherally surrounds the insert and the modular plug connector along an entire length of the insert and the modular plug connector.

12. The assembly of claim 11, wherein the metal strap includes blocking walls engaging the modular plug connector to hold the relative position of the modular plug connector with respect to the metal strap.

13. The assembly of claim 11, wherein the insert further comprises an adapter having a connector chamber, the metal strap having retention tabs extending from the walls, the retention tabs securing the metal strap within the connector chamber of the adapter, the adapter being loaded into the cavity of the circular plug shell.

14. The assembly of claim 11, wherein the metal strap includes retention tabs extending from the walls, the retention tabs engaging the main wall of the circular plug shell to hold the metal strap within the opening.

15. The assembly of claim 11, further comprising a modular plug connector received in the metal strap, the modular plug connector having a latch held in a depressed position by the latch retainer.

16. A plug assembly comprising:

a circular plug shell having a cavity configured to receive a modular plug connector therein, the circular plug shell being configured to be threadably coupled to a corresponding circular jack shell; and an insert loaded into the cavity of the circular plug shell, the insert comprising an adapter having an upper housing and a lower housing coupled together, the upper housing having an upper connector chamber and the lower housing having a lower connector chamber cooperating to receive the modular plug connector therein, the upper connector chamber having a notch configured to receive a latch of the modular plug connector extending from a top of the modular plug connector, wherein the upper housing holds the latch in a depressed position when the modular plug connector is loaded into the upper connector chamber, the lower connector chamber being configured to engage a bottom of the modular plug connector opposite the top such that the lower housing does not engage the latch.

17. The assembly of claim 16, wherein the upper housing is semicircular in shape extending around portions of both sides of the modular plug connector and the top of the modular plug connector across the latch of the modular plug connector, and wherein the lower housing is semicircular in shape extending around portions of both sides of the modular plug connector and the bottom of the modular plug connector.

18. The assembly of claim 16, wherein the upper and lower housings include securing features for securing the upper and lower housings together.

19. The assembly of claim 16, wherein the upper and lower housings include crush ribs and posts extending into the upper and lower connector openings, the crush ribs and posts being configured to engage the modular plug connector when the modular plug connector is loaded into the upper and lower connector openings.

20. The assembly of claim 16, further comprising a modular plug connector received in the adapter, the modular plug connector having a latch held in a depressed position by the upper housing.

* * * * *